United States Patent [19]

Kim

[11] Patent Number: 5,739,871
[45] Date of Patent: Apr. 14, 1998

[54] AUTOMATIC HIGH-LUMINANCE COMPRESSION METHOD AND CIRCUIT ADOPTING THE SAME

[75] Inventor: Ji-ho Kim, Seoul, Rep. of Korea

[73] Assignee: Samsung Electronics Co., Ltd., Kyungki-do, Rep. of Korea

[21] Appl. No.: 522,086

[22] Filed: Aug. 31, 1995

[30] Foreign Application Priority Data

Aug. 31, 1994 [KR] Rep. of Korea ............... 94-21915

[51] Int. Cl.⁶ ............................. H04N 9/68; H04N 5/16
[52] U.S. Cl. ..................... 348/674; 348/354; 348/687
[58] Field of Search ........................ 348/674, 678, 348/687, 363, 354, 690, 364; H04N 9/68, 9/69, 5/16

[56] References Cited

U.S. PATENT DOCUMENTS

| | | | |
|---|---|---|---|
| 5,130,786 | 7/1992 | Murata et al. | 348/391 |
| 5,291,288 | 3/1994 | Masuda et al. | 348/252 |
| 5,343,246 | 8/1994 | Arai et al. | 348/363 |

*Primary Examiner*—Glenton B. Burgess
*Attorney, Agent, or Firm*—Sughrue, Mion, Zinn, Macpeak & Seas, PLLC

[57] ABSTRACT

An automatic high-luminance compression circuit for compressing input luminance information for a high-luminance expression of an image includes an input end for receiving n-bit input luminance information, a controller for receiving (n-k)-bit input luminance information comprised of (n-k) bits starting from the most significant bit (MSB) among the n-bit input luminance information received via the input end, and generating a region select signal for selecting a sub-region for enhancing a luminance expression degree among sub-regions according to a distribution result of (n-k)-bit input luminance information with respect to the sub-regions which exist in a high-luminance region and are discriminated with each other according to a value of the (n-k)-bit input luminance information, a corrector for correcting k-bit input luminance information compressed of k bits starting from the least significant bit (LSB) in the n-bit input luminance information received via the input end, so that the sub-region selected in the region select signal occupies a wide range in the high-luminance region and at least one sub-region occupies a narrow range therein, in order to output the n-bit input information, and a high-luminance compression processor for compressing the corrected n-bit input luminance information output from the corrector according to the stored high-luminance compression characteristic. Capacity of a memory for storing respectively different high-luminance compression characteristics adapted for a high-luminance distribution can be reduced and a high-luminance compression operation can be performed using a compression characteristic adapted for the high-luminance distribution of a video signal.

16 Claims, 7 Drawing Sheets

AUTOMATIC HIGH-LUMINANCE COMPRESSION METHOD AND CIRCUIT ADOPTING THE SAME

BACKGROUND OF THE INVENTION

1. Field of the Invention

The present invention relates to an automatic high-luminance compression method and an apparatus adopting the same, and more particularly to an automatic high-luminance compression method and apparatus capable of enhancing a luminance expression degree with respect to a portion of high-luminance components on the basis of high-luminance distribution of input luminance signals.

2. Description of Related Art

Conventionally, a system such as a video camera can process luminance information belonging to a low-luminance region so that a human eye can discern a degree of brightness. On the other hand, it is difficult to process luminance information belonging to high-luminance regions so that the human eye can discern degrees of brightness. To solve the above problem, a system such as a recent video camera has a high-luminance function, and processes the high-luminance component of an input video signal using a sectional compression function instead of using a clip circuit to remove the high-luminance component, with a result that a human can discern differences in degrees of brightness which are not minute.

Figure 1:
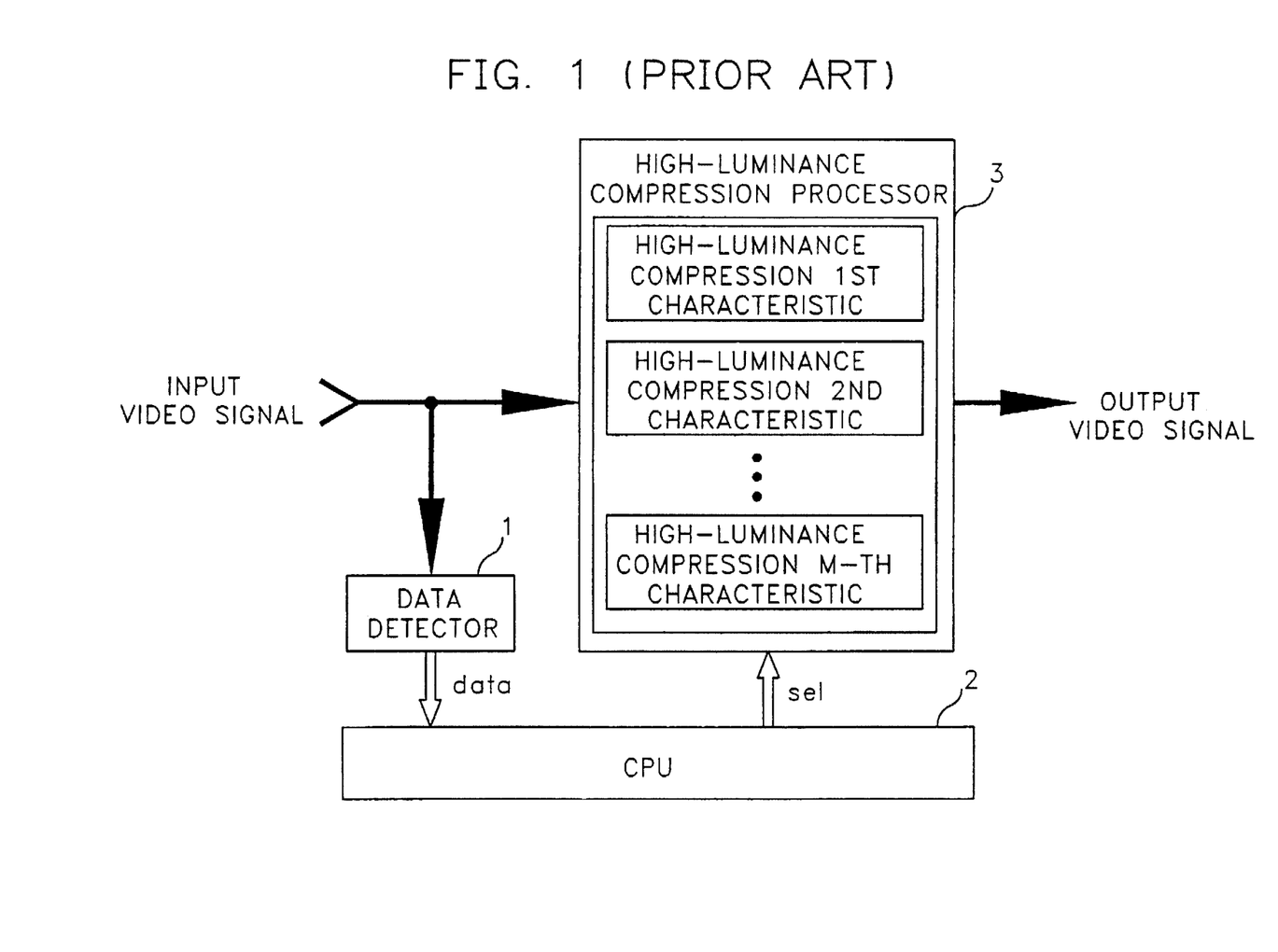
FIG. 1 is a block diagram of a conventional high-luminance compression circuit.
Figure 2A:
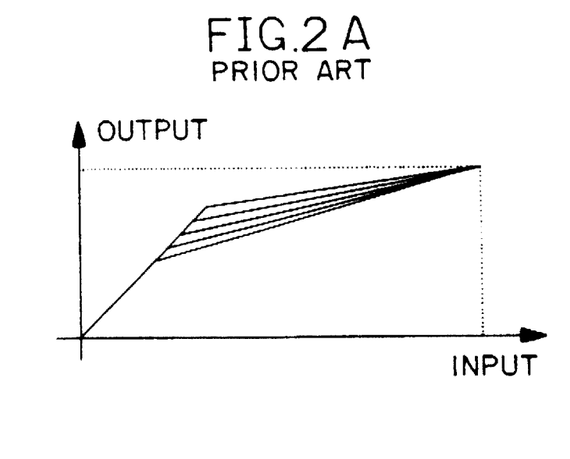
FIGS. 2A through 2D are views showing various kinds of high-luminance compression characteristic graphs which are used in a high-luminance compression processor 3 in FIG. 1.
Figure 2B:
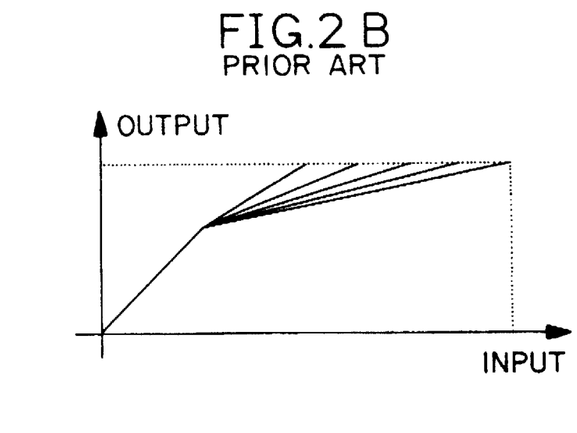
Figure 2C:
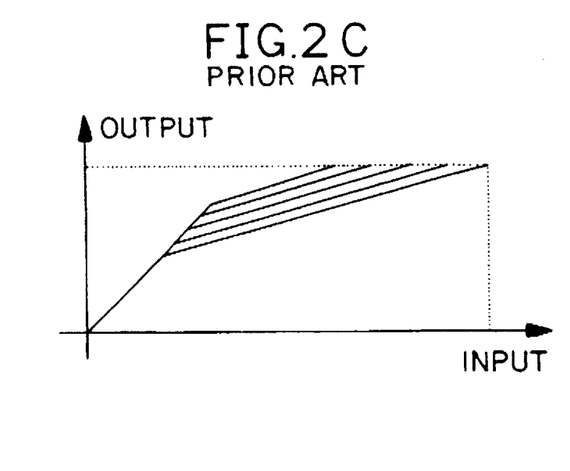
Figure 2D:
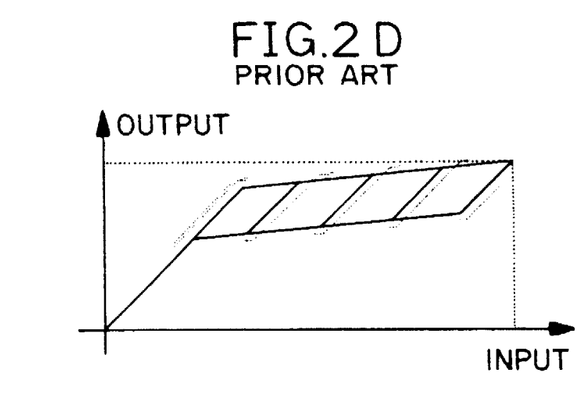

FIG. 1 shows a conventional high-luminance compression circuit which uses the above high-luminance compression function. In FIG. 1, an input video signal is applied to a data detector 1 and a high-luminance compression processor 3, respectively. Data detector 1 detects only high-luminance component data DATA from the input video signal and outputs the detection result to a central processing unit (CPU) 2. CPU 2 analyzes luminance distribution of the input data, selects a compression characteristic appropriate for the input data, and outputs a select control signal SEL corresponding to the selected compression characteristic to high-luminance compression processor 3. High-luminance compression processor 3 uses the high-luminance characteristic corresponding to select control signal SEL applied from CPU 2 among a plurality of pre-stored high-luminance compression a characteristics and compresses high-luminance component of the input video signal. Examples of the high-luminance characteristics used in the FIG. 1 circuit are shown in the form of characteristic graphs in FIGS. 2A through 2D. The characteristic graphs shown in FIGS. 2A through 2D are for assigning various input/output characteristics to luminance values of the video signal, in which the low-luminance component of the input video signal is not compressed and output nearly as it is, while the high-luminance component thereof is compressed according m the various input/output characteristics by using the FIG. 1 circuit. Among the characteristic graphs shown in FIGS. 2A through 2D, the characteristic graphs of FIG. 2C are widely used due to the relative facility of their realization in comparison with the other characteristic graphs. When high-luminance compression processor 3 uses the FIG. 2C characteristic graphs, high-luminance compression processor 3 does not compress the low-luminance component of the input video signal according to the characteristic graphs, and outputs the low luminance component of the input signal unchanged, while the high-luminance compression processor 3 compresses the high-luminance component of the input video signal according to the characteristic graphs selected by select control signal SEL applied from CPU 2. Here, the characteristic graph selected by select control signal SEL is one of the characteristic graphs having smaller slopes in FIG. 2C.

However, such an existing system should store a large amount of compression characteristic information to obtain mutually different compression characteristics with respect to high-luminance components, which causes a problem that increases an amount of hardware. Also, the existing system compresses the high-luminance components of the input video signal on the basis of the pre-stored high-luminance compression characteristics. Accordingly, when an optimum high-luminance compression characteristic cannot be used for high-luminance distribution of the input video signals, a high-luminance compression efficiency is lowered.

SUMMARY OF THE INVENTION

Therefore, to solve the above problems, it is an object of the present invention to provide an automatic high-luminance compression method in which input luminance information is differently processed for every sub-region on the basis of data distribution of the input luminance information with respect to the sub-regions in a high-luminance region, thereby enabling an optimum high-luminance compression operation appropriate for the high-luminance distribution of the input luminance information even by using a single high-luminance compression characteristic.

Another object of the present invention is to provide an automatic high-luminance compression circuit for high-luminance-compressing input luminance information which is differently corrected for every sub-region on the basis of data distribution of the input luminance information with respect to the sub-regions in a high-luminance region according to a single high-luminance compression characteristic, thereby enabling an optimum high-luminance compression operation appropriate for the high-luminance distribution of the input luminance information while reducing capacity of the memory for storing the high-luminance compression characteristic.

Thus, to accomplish the above object of the present invention, there is provided an automatic high-luminance compression method for compressing input luminance information for a high-luminance expression of an image, the automatic high-luminance compression method comprising the steps of:

(a) dividing a high-luminance region into a plurality of sub-regions on the basis of (n-k)-bit input luminance information comprised of (n-k) bits starting from the most significant bit (MSB) among n-bit input luminance information;

(b) receiving the n-bit input luminance information;

(c) selecting a sub-region capable of enhancing a luminance expression degree among the sub-regions on the basis of an analysis of data distribution of the (n-k)-bit input luminance information among the received n-bit input luminance information in step (b) with respect to the plurality of the sub-regions divided in step (a);

(d) outputting corrected n-bit input luminance information by correcting k-bit input luminance information comprised of k bits staging from the least significant bit (LSB) in the n-bit input luminance information received in step (b), so that the sub-region selected in step (c) occupies a wide range in a high-luminance region and at least one sub-region which is not selected in step (c) occupies a narrow range in the high-luminance region; and (e) compressing the corrected n-bit input luminance information output from step (d) according to a predetermined high-luminance compression characteristic.

To accomplish the other object of the present invention, there is provided an automatic high-luminance compression circuit for compressing input luminance information for a high-luminance expression of an image, the automatic high-luminance compression circuit comprising:

an input end for receiving n-bit input luminance information;

control means for receiving (n-k)-bit input luminance information comprised of (n-k) bits starting from the most significant bit (MSB) among the n-bit input luminance information received via the input end, and generating a region select signal for selecting a sub-region for enhancing a luminance expression degree among sub-regions according to a distribution result of (n-k)-bit input luminance information with respect to the sub-regions which exist in a high-luminance region and are discriminated with each other according to a value of the (n-k)-bit input luminance information;

correction means for correcting k-bit input luminance information compressed of k bits starting from the least significant bit (LSB) in the n-bit input luminance information received via the input end, so that the sub-region selected in the region select signal occupies a wide range in the high-luminance region and at least one sub-region occupies a narrow range therein, in order to output the n-bit input information; and a high-luminance compression processor for compressing the corrected n-bit input luminance information output from the correction means according to the stored high-luminance compression characteristic.

BRIEF DESCRIPTION OF THE DRAWINGS

The preferred embodiments are described with reference to the drawings wherein:

FIGS. 4A through 7D are views for explaining data correction of k-bit input luminance information in n-bit input luminance information based on the high-luminance distribution:

DETAILED DESCRIPTION OF THE PREFERRED EMBODIMENT

A preferred embodiment of the present invention will be described below in more detail with reference to the accompanying drawings FIGS. 3 through 7D.

Figure 3:
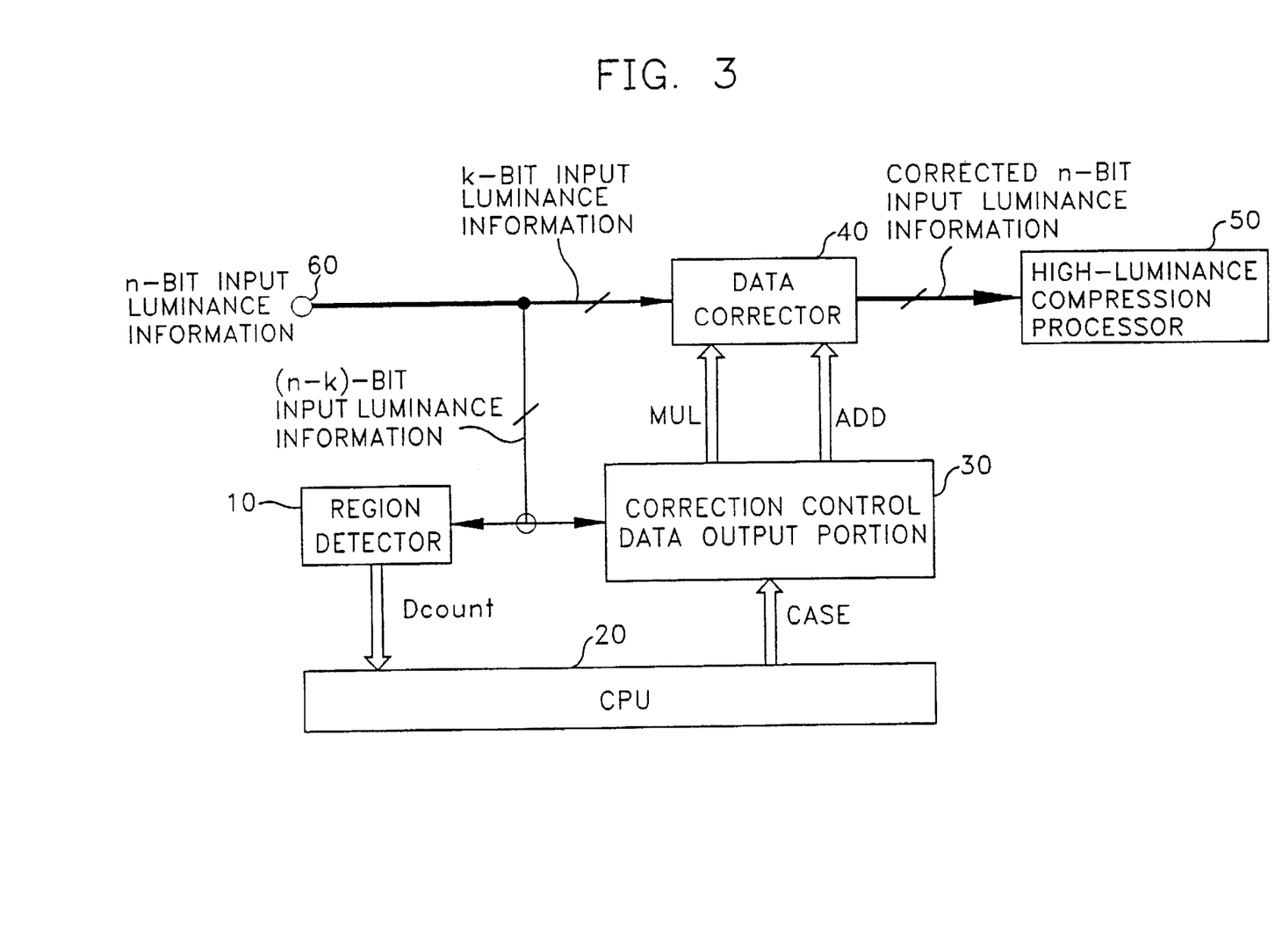
FIG. 3 is a block diagram of an automatic high-luminance compression circuit according to a preferred embodiment of the present invention.

In FIG. 3 showing an automatic high-luminance compression circuit according to a preferred embodiment of the present invention, n-bit luminance information is input to a circuit of FIG. 3 via an input end 60. Then, (n-k)-bit input luminance information comprised of (n-k) bits starting from the most significant bit (MSB) of the n-bit input luminance information is applied to region detector 10 and correction control data output portion 30, respectively. Also, k-bit input luminance information comprised of k bits starting from the least significant bit (LSB) of the n-bit input luminance information is applied to data corrector 40. The above n and k are integers which have the following relationship therebetween: n>k.

Region detector 10 counts the number of the (n-k)-bit input luminance information belonging to the respective sub-regions to be described below in connection with FIG. 4C. A central processing unit (CPU) 20 analyzes distribution of the n-bit input luminance information with respect to the sub-regions on the basis of the counted number of every sub-region applied from region detector 10. CPU 20 generates a select control signal CASE having a mutually different value according to the analyzed distribution.

A correction control data output portion 30 outputs first and second correction control data MUL and ADD having mutually different values according to select control signal CASE output from CPU 20 and the (n-k)-bit luminance information applied via input end 60. A data corrector 40 corrects k-bit luminance information input via input end 60 according to correction control data MUL and ADD output from correction data output portion 30. That is, data corrector 40 produces corrected n-bit input luminance information by performing multiplication and addition operations of k-bit input luminance information according to first and second correction control data MUL and ADD. A high-luminance compression processor 50 processes the corrected n-bit input luminance information according to one of the stored high-luminance compression characteristics, to compress a high-luminance component of the n-bit input luminance information.

Figure 4A:
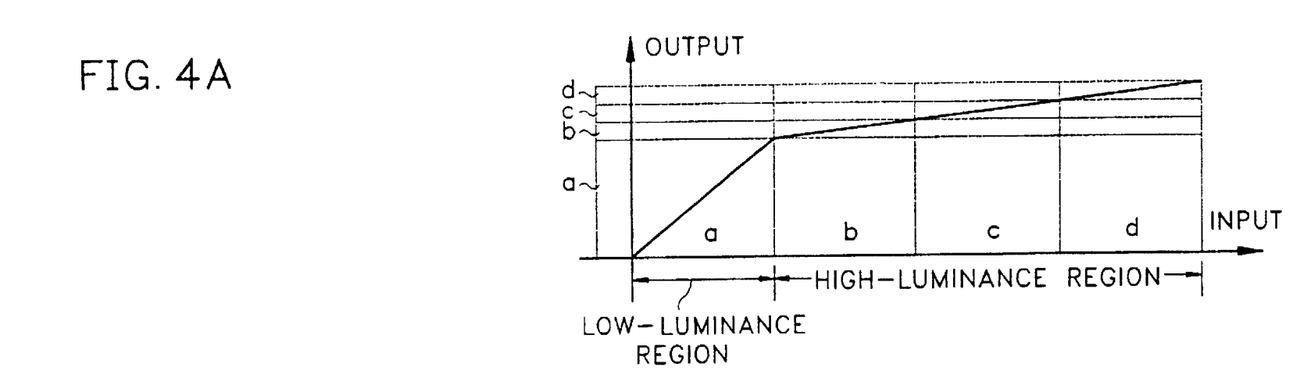
FIGS. 4A through 4D are views for explaining a case that k-bit input luminance information belonging to sub-regions in a high-luminance region is identically processed.
Figure 4B:
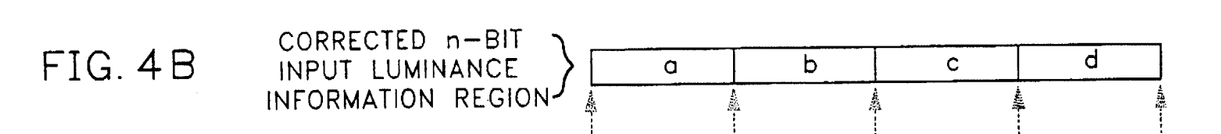

The high-luminance compression characteristic curve used in one embodiment of the present invention is shown in the form of an input/output characteristic curve of FIG. 4A. The input/output characteristic curve shown in FIG. 4A is used to produce the n-bit output luminance information corresponding to the corrected n-bit input luminance information output from data corrector 40 after being stored in the form of a look-up table in high-luminance compression processor 50. The input/output characteristic curve shown in FIG. 4A shows that input/output characteristics are different from each other in a low-luminance region and a high-luminance region, respectively. Preferably, the characteristic curve close to a line having a low slope compared with the input/output characteristic curve of the low-luminance region is used as the input/output characteristic curve of the high-luminance region.

Figure 4C:
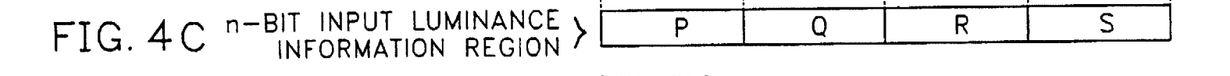
Figure 4D:
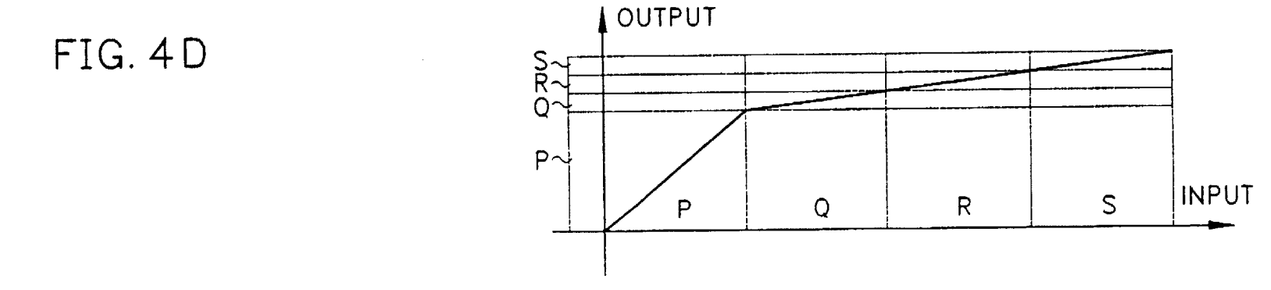

The n-bit input luminance information applied to the FIG. 3 circuit via input end 60 is segmented into four regions P, Q, R and S as shown in FIG. 4C, according to a value of the (n-k)-bit input luminance information comprised of (n-k) bits starting from the MSB in the n-bit input luminance information. Particularly, region P is set to be the same region as the low-luminance region "a" in FIG. 4A. Then, the remainder regions Q, R and S become sub-regions constituting high-luminance regions, respectively. The four regions P, Q, R and S shown in FIG. 4C have the same intervals even in FIGS. 5C, 6C and 7C.

Region detector 10 judges to which region among the sub-regions Q, R or S, respective (n-k)-bit input luminance information in the n-bit input luminance information received via input end 60 belongs. Region detector 10 counts the number of the (n-k)-bit input luminance information with respect to the respective sub-regions based on the judgement result. Counted data Dcount representing the number of the counted (n-k)-bit input luminance information belonging to each sub-region is output to CPU 20. CPU 20 analyzes high-luminance distribution with respect to the sub-regions on the basis of the counted data Dcount, and generates a select control signal CASE on the basis of the analyzed high-luminance distribution. In more detail, CPU 20 generates select control signal CASE having a value of "1" when the number of the (n-k)-bit input luminance information is not concentrated in only one sub-region. CPU 20 generates select control signal CASE having a value for selecting the sub-region having the largest number of the counted input luminance information as a luminance expression emphasis region, when the sub-region having the largest number of the counted (n-k)-bit input luminance information has more than twice as many as those of the other sub-regions. That is, CPU 20 generates select control signal CASE having a value of "2" when a sub-region Q is selected as a luminance expression emphasis region, generates select control signal CASE having a value of "3" when a sub-region R is selected as a luminance expression emphasis region, and generates select control signal CASE having a value of "4" when a sub-region S is selected as a luminance expression emphasis region. It is preferred that such a select control signal CASE is generated in units of an image frame or field having a predetermined number in which luminance of the images is not much changed.

Select control signal CASE generated in CPU 20 is supplied to correction control data output portion 30. Correction control data output portion 30 outputs first and second correction control data MUL and ADD corresponding to select control signal CASE and (n-k)-bit input luminance information via input end 60, among a plurality of the stored correction data, to data corrector 40. The following Table 1 shows an example of first and second correction control data which is determined by select control signal CASE and (n-k)-bit input luminance information when n=10 and n−k=2. The present invention is not limited to this case. However, for better understanding of the present invention, one embodiment of the present invention will be described using Table 1 produced when n=10 and n−k=2.

TABLE 1

<#1>

| (n−k)-bit input luminance information | MUL | ADD | (n−k)-bit) input luminance information | MUL | ADD |
|---|---|---|---|---|---|
| CASE=1 | | | CASE=2 | | |
| 00 | 1 | 000 | 00 | 1 | 000 |
| 01 | 1 | 010 | 01 | 2 | 010 |
| 10 | 1 | 100 | 10 | ½ | 110 |
| 11 | 1 | 110 | 11 | ½ | 111 |
| CASE=3 | | | CASE=4 | | |
| 00 | 1 | 000 | 00 | 1 | 000 |
| 01 | ½ | 010 | 01 | ½ | 010 |
| 10 | 2 | 011 | 10 | ½ | 011 |
| 11 | ½ | 111 | 11 | 2 | 101 |

Correction control data output portion 30 outputs first and second correction control data MUL and ADD corresponding to the k-bit input luminance information applied via input end 60, among four kinds of first and second correction control data MUL and ADD in Table 1 in correspondence to select control signal CASE output from CPU 20, to data corrector 40. Here, first and second correction control data MUL and ADD applied to data corrector 40 is generated on the basis of the (n-k)-bit input luminance information comprised of the n-bit input luminance information together with the k-bit input luminance information. Data corrector 40 processes the k-bit input luminance information received via input end 60 according to first and second correction control data MUL and ADD. In more detail, data corrector 40 multiplies the input k-bit input luminance information by first correction control data MUL. The multiplication of the first correction data shown in Table 1 by the k-bit input luminance information is accomplished by shifting the k-bit input luminance information by one bit toward the MSB when the first correction control data MUL is 2, as well known to one having an ordinary skill in the art. When first correction control data MUL is ½, the multiplication operation is accomplished by shifting the k-bit input luminance information by one bit toward the LSB. When the multiplication operation is accomplished, data corrector 40 adds second correction control data ADD to the multiplied result. Particularly, second correction control data ADD is added to the multiplied result, in the places of the bits from the MSB n to the (n-k)$^{th}$ bit, when the multiplied result is expressed as n-bit information. The k-bit luminance information applied to data corrector 40 by the above multiplication and addition operations, is converted into corrected n-bit input luminance information having a length of n bits. A high-luminance compression processor 50 processes the corrected n-bit input luminance information supplied from data corrector 40 according to an input/output characteristic curve shown in FIG. 4A.

Specific examples of the FIG. 3 circuit achieving the high-luminance compression will be described below with reference to FIGS. 4A through 7D.

If a value of select control signal CASE generated by CPU 20 is "1," correction control data output portion 30 outputs first and second correction control data MUL and ADD corresponding to a value of the k-bit input luminaace information among the correction data when CASE=1 in Table 1, to data corrector 40. Data corrector 40 performs multiplication and addition operations of first and second correction data MUL and ADD and the k-bit luminaace information applied from input end 60. In this case, since a value of the corrected n-bit input luminance information output from data corrector 40 does not vary, the value has the same value as the n-bit input luminaace information received via input end 60. Thus, the sub-regions of FIG. 4C possessed by the n-bit input luminance information received in the FIG. 3 circuit via input end 60 is the same regions as those of FIG. 4B possessed by the corrected n-bit input luminaace information output from data corrector 40. That is, the sub-region Q and the sub-region b are identical to each other, and the remainder sub-regions R and S are the same as the corresponding sub-regions c and d. As a result, the input/output characteristic of FIG. 4A of high-luminance compression processor 50 with respect to the n-bit input luminance information received via input end 60 is identical to the input/output characteristic of FIG. 4D of high-luminance compression processor 50 with respect to the n-bit input luminance information corrected by data corrector 40.

If a value of select control signal CASE is "2," correction control data output portion 30 outputs first and second correction data MUL and ADD corresponding to a value of the k-bit input luminance information among the correction data when CASE=2 in Table 1, to data corrector 40. Data corrector 40 multiplies the k-bit luminance information applied from input end 60 by first correction control data MUL, and then adds second correction control data ADD to the multiplied result value. As a result, the k-bit input luminance information belonging to the sub-region Q is multiplied by first correction control data MUL of which the value is "2." Thus, the value of the information is doubled. When the multiplication result is expressed as the n-bit luminance information, second correction control data ADD being a value "$010_2$" is added to places of 3 bits from the MSB. Thus, the k-bit input correction control data ADD belonging to the sub-region Q is changed into the corrected n-bit input luminance information within the sub-region b of FIG. 5B by data corrector 40, of which the region for expressing the luminance information is widened. The k-bit input luminance information belonging to the sub-region R is multiplied by first correction control data MUL of which the value is "½." Thus, the value of the information becomes reduced by half. When the multiplication result is expressed as the n-bit luminance information, data "$110_2$" is added to places of 3 bits from the MSB. Thus, the k-bit input correction control data ADD belonging to the sub-region R is changed into the corrected n-bit input luminance information within the sub-region c of FIG. 5B by data corrector 40, of which the region range for expressing the luminance information is narrowed.

Figure 5A:
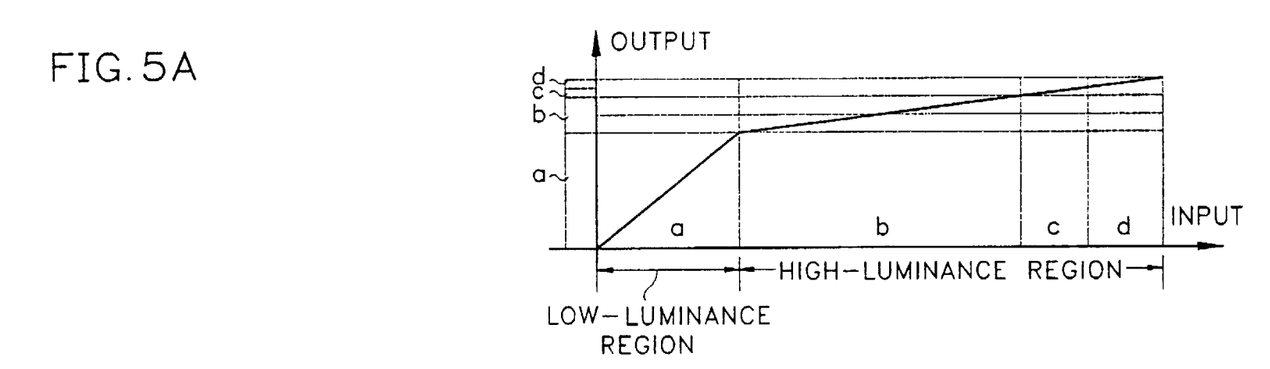
FIGS. 5A through 5D are views for explaining a case that a luminance expression degree of k-bit input luminance information belonging to sub-region Q is higher than those of other sub-regions R and S.
Figures 5B, 5C:
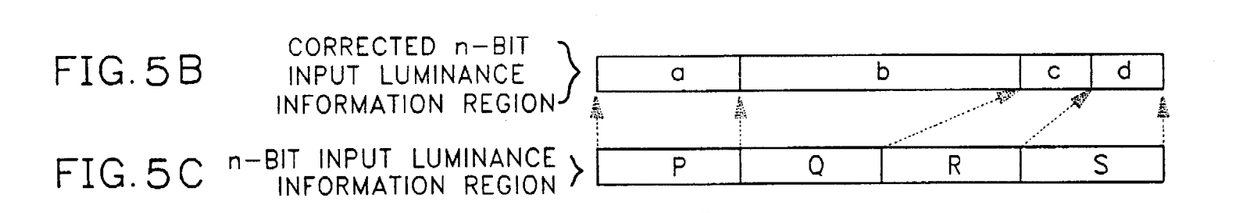
Figure 5D:
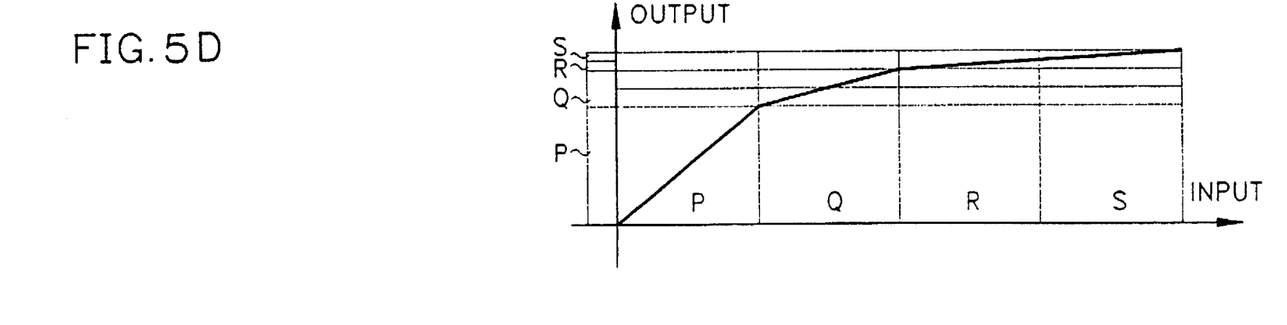

Since the k-bit input luminance information belonging to the sub-region S is performed in multiplication and addition operations, the k-bit input correction control data ADD belonging to the sub-region S is changed into the corrected n-bit input luminance information within the sub-region d of FIG. 5B, of which the region for expressing the luminance information is narrowed. As a result, the degrees of luminance expressed with respect to the n-bit input luminance information belonging to the sub-regions Q become greater and the degrees of luminance expressed with respect to the n-bit input luminance information belonging to the sub-regions R and S become relatively less. Thus, the corrected n-bit input luminance information output from data corrector 40 is applied to high-luminance compression processor 50 with the altered sub-regions as shown in FIG. 5B. That is, the corrected n-bit input luminance information becomes an input of FIG. 5A. As a result, a high-luminance compression characteristic between the n-bit input luminance information of FIG. 5C received in the FIG. 3 circuit via input end 60 and the n-bit output luminance information which is finally output from high-luminance compression processor 50 is shown in FIG. 5D. That is, the degrees of luminance expression with respect to the n-bit input luminance information belonging to the sub-region Q become greater than those of the other sub-regions R and S.

Figure 6A:
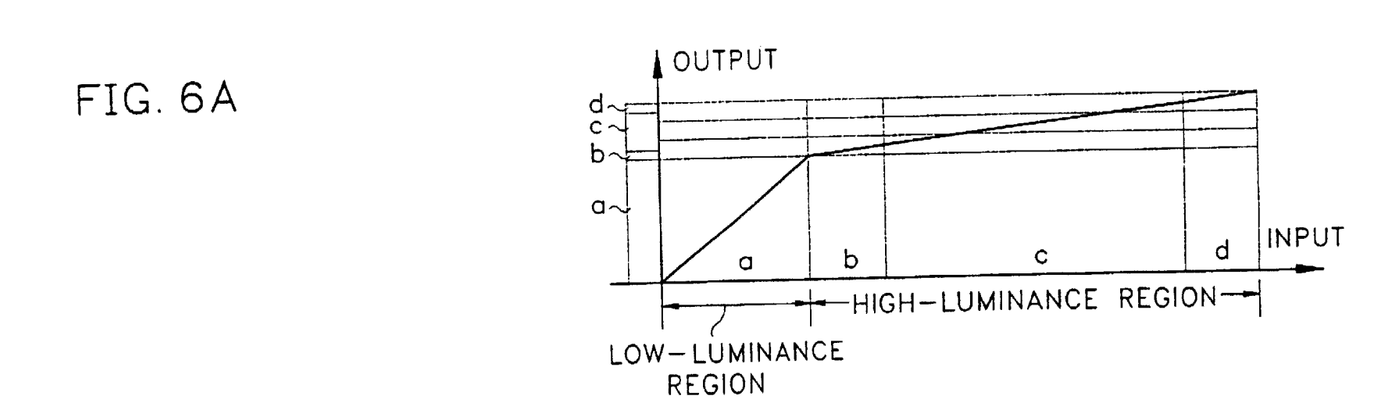
FIGS. 6A through 6D are views for explaining a case that a luminance expression degree of k-bit input luminance information belonging to sub-region R is higher than those of other sub-regions Q and S.
Figure 6B:
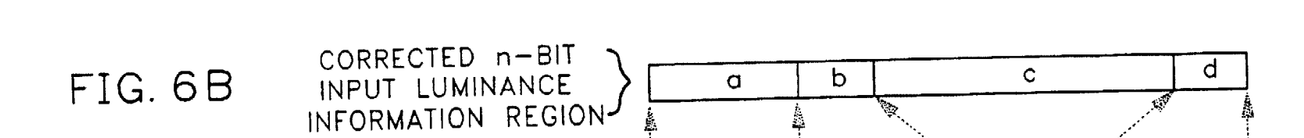
Figure 6C:
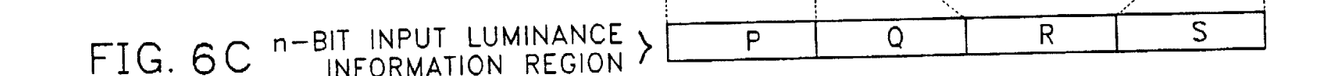
Figure 6D:
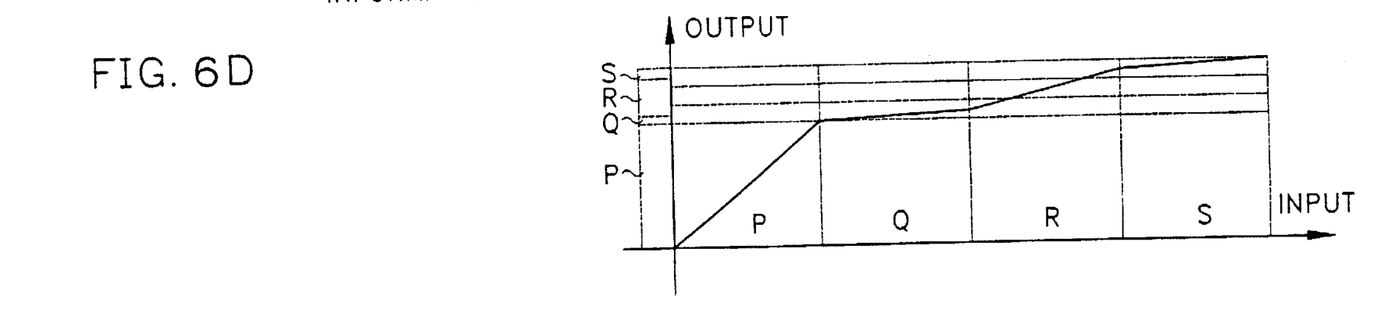

When a value of select control signal CASE is "3," data corrector 40 uses first and second correction data MUL and ADD corresponding to the (n-k)-bit input luminance information when CASE=3 in Table 1, for the purpose of processing the corresponding k-bit input luminance information. Thus, a value of the k-bit input luminance information belonging to the sub-region Q becomes reduced by half, and then the result is added to second correction control data "$0100000000_2$." A value of the k-bit input luminance information belonging to the sub-region R is doubled, and then the result is added to data "$0110000000_2$." A value of the k-bit input luminance information belonging to the sub-region S becomes reduced by hall and then the result is 65 added to data "$1110000000_2$." As a result, the luminance degrees expressed with respect to the n-bit luminance information belonging to the sub-region R is doubled, and the luminance degrees expressed with respect to the n-bit luminance information belonging to the sub-regions Q and S becomes relatively lower by half. The region ranges possessed by the sub-regions b, c and d in case of the variable luminance expression degree are shown in FIG. 6B. When the corrected n-bit input luminance information output from data corrector 40 is applied to high-luminance compression processor 50 in the form of possessing the altered sub-regions as shown in FIG. 6B, the input/output characteristic between the n-bit input luminance information via input end 60 and the n-bit output luminance information finally output from high-luminance compression processor 50 is shown in FIG. 6D. FIG. 6D shows that the luminance expression degree with respect to the n-bit input luminance information belonging to the sub-region R becomes relatively higher than those of the other sub-regions Q and S.

Figure 7A:
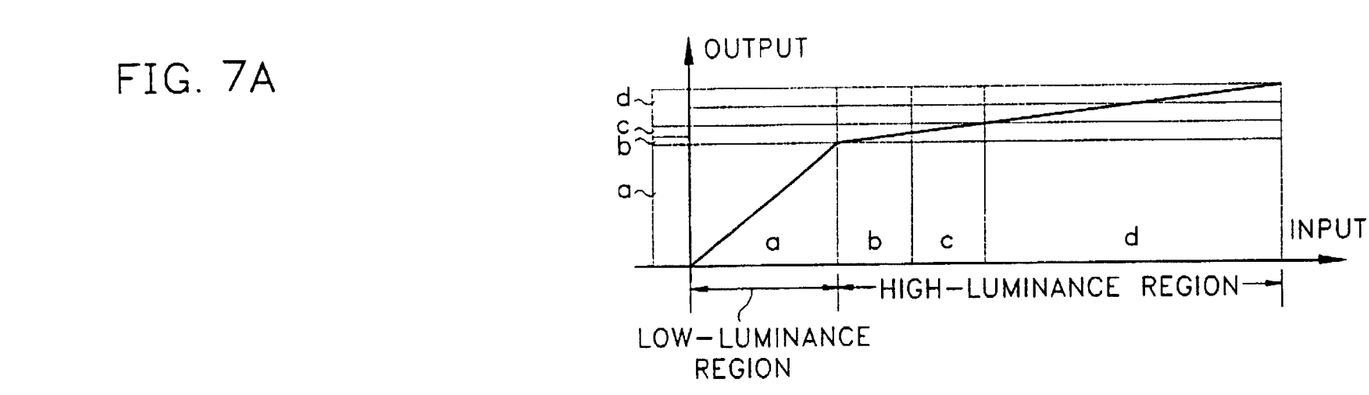
FIGS. 7A through 7D are views for explaining a case that a luminance expression degree of k-bit input luminance information belonging to sub-region S is higher than those of other sub-regions Q and R.
Figures 7B, 7C:
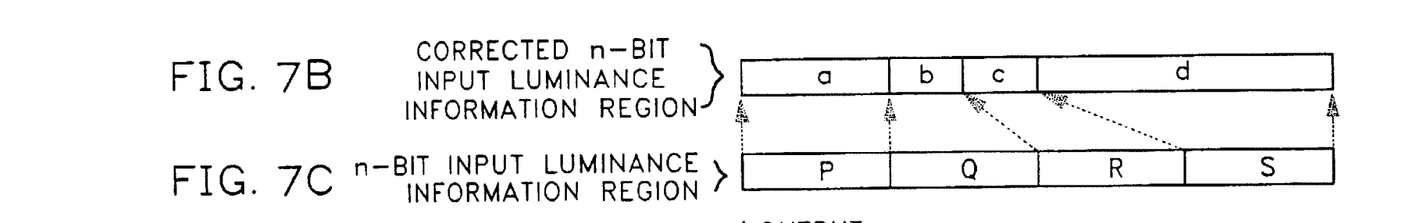
Figure 7D:
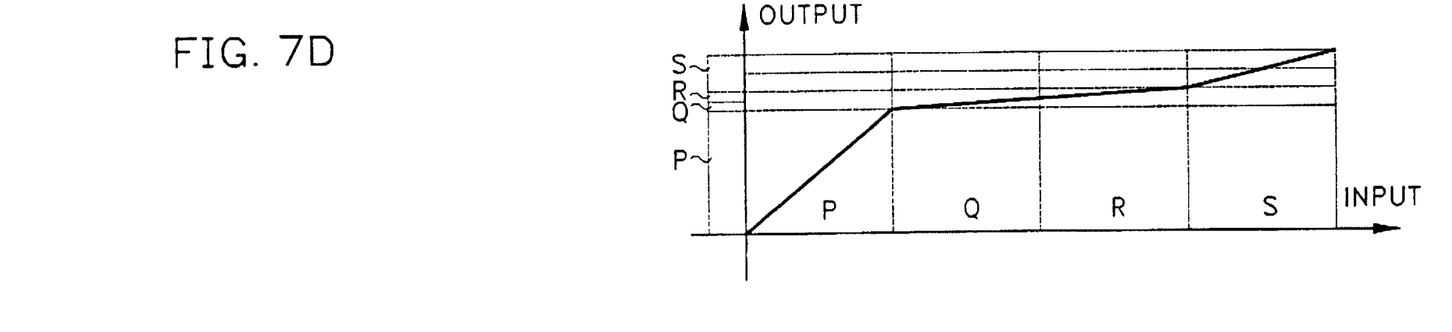

When a value of select control signal CASE is "4," data corrector 40 uses first and second correction data MUL and ADD corresponding to the (n-k)-bit input luminance information when CASE=4 in Table 1, for the purpose of processing the corresponding k-bit input luminance information. Thus, a value of the k-bit input luminance information belonging to the sub-region Q becomes reduced by half, and then the result is added to second correction control data "$0100000000_2$." A value of the k-bit input luminance information belonging to the sub-region R becomes reduced by half, and then the result is added to data "$0110000000_2$." A value of the k-bit input luminance information belonging to the sub-region S is doubled, and then the result is added to data "$1010000000_2$." As a result, the luminaace expression degree with respect to the n-bit luminance information belonging to the sub-region S is increased by a factor of two, and the luminance expression degree with respect to the n-bit luminance information belonging to the sub-regions Q and R becomes relatively lower by half. When the corrected n-bit input luminaace information output from data corrector 40 is applied to high-luminance compression processor 50 having the altered sub-regions as shown in FIG. 7B, the input/output characteristic between the n-bit input luminance information via input end 60 and the n-bit output luminance information finally output from high-luminance compression processor 50 is shown in FIG. 7D. As shown in FIG. 7D, it can be seen that the luminance expression degree with respect to the n-bit input luminance information belonging to the sub-region S becomes relatively higher than those of the other sub-regions Q and R. Although the signal processing with respect to the n-bit input luminaace information belonging to the low luminance region is not specifically described in the above descriptions, the signal processing of the FIG. 3 circuit will be well understood in connection with the n-bit input luminance information belonging to the low luminance region on the basis of the contents of the above descriptions.

In the above-described embodiment, although the input/output characteristic curve shown in FIG. 4A is used as a characteristic curve for the high-luminance compression, it will be apparent to a person who has an ordinary skill in the art that the luminance compression characteristic curve shown in FIG. 4A can be replaced by other types of luminance compression characteristic curves.

As described above, the present invention enables the luminance expression range for the sub-region to enhance a luminance expression degree among the sub-regions to be wider than those of the other sub-regions on the basis of the high-luminance distribution with respect to the sub-regions of the n-bit input luminance information, thereby enabling a high-luminance compression processing optimized in the high-luminance distribution of the luminance information. Also, the present invention corrects the k-bit input luminance information so as to alter the luminance expression range with respect to the sub-regions and obtains high-luminance compression result optimized in the high-luminance distribution of the video signal using a single high-luminance compression characteristic, which brings an effect that capacity of the memory necessary for storing respectively different high-luminance compression characteristics adapted for the high-luminance distribution.

While only certain embodiments of the invention have been specifically described herein, it will apparent that numerous modifications may be made thereto without departing from the spirit and scope of the invention.

What is claimed is:

1. An automatic high-luminance compression circuit for compressing input luminance information for a high-luminance expression of an image, said automatic high-luminance compression circuit comprising:

an input end for receiving n-bit luminance information;

control means for receiving (n-k)-bit input luminance information comprised of (n-k) bits starting from the most significant bit (MSB) among the n-bit input luminance information received via the input end, and generating a region select signal for selecting a sub-region for enhancing a luminance expression degree among sub-regions according to a distribution result of the (n-k)-bit input luminance information with respect to the sub-regions which exist in a high-luminance region and are discriminated with each other according to a value of the (n-k)-bit input luminance information;

correction means for correcting k-bit input luminance information comprised of k bits starting from the least significant bit (LSB) in the n-bit input luminance information received via the input end, so that the sub-region selected by the region select signal occupies a wide range in the high-luminance region and at least one sub-region occupies a narrow range therein, in order to output corrected n-bit input luminance information; and a high-luminance compression processor for compressing the corrected n-bit input luminance information output from the correction means according to a stored high-luminance compression characteristic.

2. The automatic high-luminance compression circuit according to claim 1, wherein said control means generates the region select signal every image frame having a predetermined number.

3. The automatic high-luminance compression circuit according to claim 2, wherein said control means generates the region select signal every image field having a predetermined number.

4. The automatic high-luminance compression circuit according to claim 1, wherein said control means comprises:

a region detector for receiving the (n-k)-bit input luminance information in the n-bit luminance information received via said input end, counting values with respect to the sub-regions of the (n-k)-bit input luminance information, and outputting the counted values; and a select signal generator for generating the region select signal for selecting the sub-region having the largest counted value among the counted values output from said region detector.

5. The automatic high-luminance compression circuit according to claim 4, wherein said select signal generator generates the region select signal for selecting the sub-region corresponding to the largest counted value as a sub-region for enhancing the luminance expression degree, when the counted value is larger than the other counted values by more than a predetermined multiple.

6. The automatic high-luminance compression circuit according to claim 1, wherein said correction means comprises:

a correction control data output portion for storing a plurality of first correction control data for altering the value of the k-bit input luminance information in each of the sub-regions which exist in a high luminance region and a plurality of second correction control data for altering the region range of each of the sub-regions, in correspondence to a sub-region for widening the region range among the sub-regions, and outputting the first and second correction control data selected by the region select signal generated by said control means and the (n-k)-bit input luminance information received via said input; and a data corrector for receiving the first and second correction control data output from said correction control data output portion and the k-bit input luminance information received via said input end, and correcting the corresponding k-bit input luminance information so as to have a value within the sub-region of which the region range is altered, using the first and second correction control data.

7. The automatic high-luminance compression circuit according to claim 6, wherein said correction control data output portion comprises a look-up table for outputting the first and second correction control data corresponding to values of said region select signal and the (n-k)-bit input luminance information.

8. The automatic high-luminance compression circuit according to claim 6, wherein said data corrector multiplies the input k-bit input luminance information by the first correction control data corresponding to the k-bit input luminance information to produce multiplied luminance information having n-bits, and adds the multiplied luminance information having n-bits and the second correction control data from the MSB of the multiplied luminance information having n-bits to the bit place occupied by the second correction control data to generate the corrected n-bit input luminance information.

9. The automatic high-luminance compression circuit according to claim 1, wherein said high-luminance compression processor stores a characteristic curve approximating a line having a low slope in comparison to an input/output characteristic curve with respect to a low-luminance region as an input/output characteristic curve with respect to the high-luminance region, and outputting compressed n-bit luminance information corresponding to the input corrected n-bit input luminance information.

10. An automatic high-luminance compression method for compressing input luminance information for a high-luminance expression of an image, said automatic high-luminance compression method comprising the steps of:

(a) dividing a high-luminance region into a plurality of sub-regions on the basis of (n-k)-bit input luminance information comprised of (n-k) bits starting from the most significant bit (MSB) among n-bit input luminance information;

(b) receiving the n-bit input luminance information;

(c) selecting a sub-region capable of enhancing a luminance expression degree among the plurality of sub-regions on the basis of an analysis of data distribution of the (n-k)-bit input luminance information among the received n-bit input luminance information in step (b) with respect to the plurality of the sub-regions divided in step (a);

(d) outputting corrected n-bit input luminance information by correcting k-bit input luminance information comprised of k bits starting from the least significant bit (LSB) in the n-bit input luminance information received in step (b), so that the sub-region selected in step (c) occupies a wide range in a high-luminance region and at least one sub-region which is not selected in step (c) occupies a narrow range in the high-luminance region; and (e) compressing the corrected n-bit input luminance information output from step (d) according to a predetermined high-luminance compression characteristic.

11. An automatic high-luminance compression method according to claim 10, wherein said step (c) comprises the steps of:

(c1) counting the number of the (n-k)-bit input luminance information among the received n-bit input luminance information belonging to a respective sub-region and outputting the counted value corresponding to the respective sub-region; and (c2) selecting a sub-region having the largest counted value among the counted values output from step (c1).

12. The automatic high-luminance compression method according to claim 11, wherein said step (c2) further comprises the step of selecting the sub-region corresponding to the largest counted value as a sub-region for enhancing all luminance expression degree, when the counted value is larger than the other counted values by more than a predetermined multiple.

13. The automatic high-luminance compression method according to claim 10, wherein said step (d) comprises step of correcting the n-bit input luminance information following the n-bit input luminance information used for selection of the sub-region to enhance the luminance expression degree.

14. The automatic high-luminance compression method according to claim 10, wherein said step (d) comprises the steps of:

(d1) storing a plurality of first correction control data for altering the value of the k-bit input luminance information in each of the plurality of sub-regions and a plurality of second correction control data for altering a range of the sub-region selected in step (c), in correspondence to a range of at least one other sub-region which is not selected in step (c);

(d2) outputting the first and second correction control data corresponding to the sub-region selected by the step (c) and the (n-k)-bit input luminance information among the n-bit input luminance information received by the step (b); and (d3) correcting corresponding k-bit input luminance information received in step (b) so as to have a value within the sub-region of which the region range is altered, using the first and second correction control data output from the step (d2).

15. The automatic high-luminance compression method according to claim 14, wherein said step (d3) comprises the steps of:

(da1) multiplying the input k-bit input luminance information by the first correction control data corresponding to the k-bit input luminance information to produce n-bit luminance information; and (da2) adding the produced n-bit luminance information and the second correction control data from the MSB of the produced n-bit luminance information produced in step (da1) to the bit place occupied by the second correction control data to generate the corrected n-bit input luminance information.

16. The automatic high-luminance compression method according to claim 10, wherein said step (e) comprises the step of outputting n-bit luminance information corresponding to the corrected n-bit input luminance information according to the high-luminance compression characteristic having an input/output characteristic curve approximating a line having a low slope in comparison to an input/output characteristic curve with respect to a low-luminance region.

* * * * *